United States Patent [19]

Cestaro et al.

[11] 4,042,177
[45] Aug. 16, 1977

[54] RECOVERY OF METALLIC LEAD, LEAD COMPOUNDS AND PLASTIC MATERIAL FROM SCRAP STORAGE BATTERIES

[75] Inventors: John P. Cestaro, Lawrenceville; Ranna K. Hebbar, Hightstown; Uriel S. Sokolov, Princeton, all of N.J.

[73] Assignee: N L Industries, Inc., New York, N.Y.

[21] Appl. No.: 729,430

[22] Filed: Oct. 4, 1976

[51] Int. Cl.$^2$ .............................................. B02C 23/36
[52] U.S. Cl. ........................................ 241/20; 241/22; 241/24; 241/30
[58] Field of Search ...................... 241/20, 22, 24, 30

[56] References Cited

U.S. PATENT DOCUMENTS

| 971,405 | 9/1910 | Reed | 241/22 |
|---|---|---|---|
| 3,393,876 | 7/1968 | Elmore | 241/20 |
| 3,493,183 | 2/1970 | Fischer et al. | 241/24 |
| 3,892,563 | 7/1975 | La Point | 241/20 |

*Primary Examiner*—Granville Y. Custer, Jr.

[57] ABSTRACT

Metallic lead, lead compounds and plastic material are recovered from the remaining inert material in scrap storage batteries by crushing the scrap storage batteries, adding the crushed material to an aqueous suspension of magnetic granular material to separate the inert and plastic material from the metallic lead and lead compounds by suspending in an aqueous magnetic suspension the inert and plastic material but not the metallic lead and lead compounds in said suspension, separating the suspension from said metallic lead and lead compounds, magnetically separating the magnetic granular material from the inert and plastic material and then removing the plastic material from the inert material by floatation in an aqueous media.

4 Claims, No Drawings

RECOVERY OF METALLIC LEAD, LEAD COMPOUNDS AND PLASTIC MATERIAL FROM SCRAP STORAGE BATTERIES

BACKGROUND OF THE DISCLOSURE

Scrap storage batteries are normally collected and processed by various methods to recover the metallic lead, lead oxide and sulfate values. Normally the scrap storage batteries contain electrode grids of lead or lead-antimony alloys, electrical connections and terminals usually made of lead-antimony alloys and pastes comprising lead oxides or lead sulfate. Normally after these lead values are recovered, the remaining portions of the batteries are thrown away as land fill.

The remaining portions comprise the battery partitions and separators generally made of paper, fiber glass, etc. and the battery casings made of either hard rubber or of plastic compositions.

Since a large proportion of the batteries in use today have plastic casings instead of being made of hard rubber, it is desirable to recover the plastic material in addition to the lead values from these scrap storage batteries. The plastic battery casings used today are normally polypropylene and copolymers thereof.

SUMMARY OF THE INVENTION

The instant invention provides a process for recovering the lead components and the plastic material from scrap storage batteries containing inert material which comprises crushing said scrap storage batteries to provide pieces having a size of less than 3 inches; adding said pieces to an aqueous suspension of magnetic granular material wherein the density of said aqueous suspension is such that the lead components settle to the bottom of the suspension while the inert components containing the plastic material remain in suspension, separating said lead components from said suspension, magnetically separating said magnetic granular material from said inert components present in said suspension, and removing by floatation in an aqueous media the plastic material from the remaining inert components to recover said plastic material.

DESCRIPTION OF THE PREFERRED EMBODIMENTS

The consumption of lead for storage batteries is increasing annually and, therefore, it becomes essential to process used lead storage batteries to recover the metallic lead, lead oxide and sulfate pastes from the batteries for reuse. In addition, it also is desirable to recover the plastic values from the batteries since plastic casings are used in great quantities today.

In carrying out the process of the instant invention, the scrap storage batteries are first crushed into small pieces, preferably to size less than 3 inches, and the metallic lead or lead-antimony alloy and the lead oxide and lead sulfate pastes are recovered from the inert constituents which include hard rubber and plastic battery casings, partitions, separator, paper and other inactive materials.

In order to recover the lead and plastic values, the crushed pieces are added to an aqueous suspension of magnetic granular material having a density less than the density of metallic lead, lead oxide and lead sulfate. The lead values remain at the bottom of the vessel while the inert material including the plastic material remains in the suspension.

The suspension is prepared by adding granular magnetite ore to water and with agitation suspending the ore particles in the water. Sufficient magnetite ore is employed to produce a suspension having a density from about 1.75 to about 3.5 g/cc, and an average granular size of $-100$ mesh (Tyler screen). Although many types of magnetic material may be used to form the suspension, various ores, such as magnetites and ilmenites, are particularly desirable to employ since they are both inexpensive and readily available.

After the metallic lead and the lead compounds are separated from the suspension, the magnetite ore granules are separated from the inert and plastic material by magnetic separation.

The remaining plastic and inert material were then separated from one another in water by floating the plastic material from the inert material which sinks to the bottom.

By use of this process up to 95% of the lead values and up to 95% of the plastic material present in the batteries may be recovered.

When batteries which contain pitch as a sealer are used in the recovery process, the pitch material is recovered with the plastic material, and in most instances should be separated from the plastic material before the plastic material is recycled.

Many industrial batteries and some automobile batteries use an asphalt pitch substance to seal the cells to the battery casings. Although the amount of pitch removed with the plastic is only about 5 to 10%, the pitch melts when the plastic is ground and the ground plastic pieces are coated with the pitch material. The melted pitch also fouls the grinding equipment.

A number of methods may be employed to separate the pitch from the plastic material. They are described as follows:

After the plastic material has been removed from the inert material described above, the plastic material which contains the pitch may be placed in an alcohol-water mixture which has a specific gravity of less than 0.95. Preferably any inexpensive alcohol may be used, e.g. ethyl or methyl alcohol. The particles of pitch, having a density of at least 1.05, sink to the bottom of the vessel and the plastic material remains floating on top. The plastic material is separated from the pitch and then the plastic material is separated from the alcohol-water solution which is recycled.

Another method for removing the pitch from the plastic material is to freeze the mixture and add the frozen mixture to water. In this method, the frozen pitch is transformed into a glass-like state which sinks to the bottom of the vessel and the plastic particles floating on the top are separated from the pitch particles.

This same separation may be accomplished by adding the pitch and plastic particles to water which has a temperature below 45° F. which transforms the pitch into a glass-like state thereby causing the pitch to sink to the bottom of the vessel, thus allowing the floating plastic to be separated from the sunken pitch particles.

The pitch may also be separated from the plastic particles by adding the mixture to water in which a wetting agent has been added to lower the surface tension of the water. The wetting agent added causes the surface of the pitch particles to become wetted and therefore the wetted pitch particles sink to the bottom while the plastic particles remain floating on the water. Wetting agents having a low HLB value are preferred. Wetting agents manufactured and sold under Tradenames Aerosol A-102 and Span 40 by American Cyanamid and Atlas Chemical Industry, respectively, are particularly satisfactory.

The pitch particles also may be removed from the plastic material by adding the mixture to a solvent which dissolves the pitch. Such solvents include xylene, toluene, trichloroethylene and other solvents which are inexpensive and readily available.

The mixture of the plastic and pitch particles may also be separated from one another by placing the mixture onto a vibrating screen, preferably inclined slightly, and because of the difference which exists between the elasticity of the plastic and the pitch particles, the plastic particles bounce off of the vibrating screen a slight distance beyond the end of the screen while the pitch particles drop off adjacent the end of the screen. This permits the plastic and pitch particles to be separately collected from one another as the particles leave the vibrating screen.

Any one or combination of these methods may be used to separate the pitch particles from the plastic material. The plastic particles obtained which contain only a small quantity of pitch may then be ground and used for recycle purposes.

While this invention has been described herein, it is not intended to be strictly limited thereto, and other variations and modifications may be employed within the scope of the following claims.

We claim:

1. Method for recovering metallic lead, lead compounds and plastic material from the inert material present in scrap storage batteries which comprises the sequential steps of crushing the scrap storage batteries; adding the crushed material to an aqueous suspension of magnetic granular material thereby to separate the inert and plastic material from the metallic lead and lead compounds; magnetically separating the magnetic granular material from the inert and plastic material; and separating the plastic material from the inert material.

2. Method for recovering metallic lead, lead compounds and plastic material from the inert material present in scrap storage batteries which comprises crushing said scrap storage batteries into pieces having a size of less than 3 inches; adding said pieces to an aqueous suspension of magnetic granular material wherein the density of said aqueous suspension is such that the metallic lead and lead compounds settle to the bottom of the suspension while the inert components containing the plastic material remain in suspension; separating said metallic lead and lead compounds from said suspension; magnetically separating said magnetic granular material from said inert components present in said suspension, and removing by floatation in an aqueous media the plastic material from the remaining inert components to recover said plastic material.

3. Method according to claim 2 in which the magnetic material is granular magnetite ore.

4. Method according to claim 3 in which the average particle size of the granular magnetite ore is −100 mesh (Tyler screen).

* * * * *